(12) United States Patent
Goerlich et al.

(10) Patent No.: US 8,516,174 B2
(45) Date of Patent: Aug. 20, 2013

(54) DATA TRANSMISSION METHOD BETWEEN MASTER AND SLAVE DEVICES

(75) Inventors: Patrick Goerlich, Reutlingen (DE); Sabine Seemann, Ostfildern (DE); Ermin Esch, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 705 days.

(21) Appl. No.: 12/598,999

(22) PCT Filed: May 7, 2008

(86) PCT No.: PCT/EP2008/055623
§ 371 (c)(1),
(2), (4) Date: Nov. 5, 2009

(87) PCT Pub. No.: WO2008/145494
PCT Pub. Date: Dec. 4, 2008

(65) Prior Publication Data
US 2010/0138576 A1 Jun. 3, 2010

(30) Foreign Application Priority Data
May 25, 2007 (DE) .................. 10 2007 024 737

(51) Int. Cl.
*G06F 13/42* (2006.01)
(52) U.S. Cl.
USPC ............. 710/105; 710/61; 710/110; 710/305
(58) Field of Classification Search
USPC .................. 710/4, 9, 61, 110, 305, 105, 106
See application file for complete search history.

(56) References Cited

U.S. PATENT DOCUMENTS

| | | | |
|---|---|---|---|
| 5,301,281 A | 4/1994 | Kennedy | |
| 5,835,785 A | 11/1998 | Overtoom et al. | |
| 6,665,593 B2 * | 12/2003 | Otterbach et al. | 701/1 |
| 7,323,991 B1 * | 1/2008 | Eckert et al. | 340/572.1 |
| 2004/0260851 A1 * | 12/2004 | Tu | 710/105 |
| 2005/0216621 A1 * | 9/2005 | Aichriedler | 710/62 |
| 2005/0278491 A1 | 12/2005 | Aakjer | |
| 2008/0183928 A1 * | 7/2008 | Devila et al. | 710/110 |

FOREIGN PATENT DOCUMENTS

| | | |
|---|---|---|
| DE | 101 09 369 | 9/2002 |
| GB | 2 408 645 | 6/2005 |
| JP | 4-313091 | 11/1992 |

OTHER PUBLICATIONS

SPI Overview and Use of the PICmicro Serial Peripheral Interface, Microchip, undated.*
SPI Block Guide v03.06, Motorola Inc. Jan. 21, 2000.*

* cited by examiner

*Primary Examiner* — Khanh Dang
(74) *Attorney, Agent, or Firm* — Kenyon & Kenyon LLP (57) ABSTRACT

A method for transmitting data frames between a master device and one or more slave devices via a bus system having at least one request line for transmitting request data frames from the master device to the slave devices, a response line for transmitting response data frames from the slave devices to the master device and at least one selection line for activating the slave devices, the request data frames and the response data frames being transmitted together with at least one address bit for addressing one of the slave devices, the useful data bits and at least one length-indicating bit for indicating the data frame length.

16 Claims, 5 Drawing Sheets

DATA TRANSMISSION METHOD BETWEEN MASTER AND SLAVE DEVICES

FIELD OF THE INVENTION

The present invention relates to a method for transmitting data frames between a master device and a plurality of slave devices, a computer program product that causes the execution of an appropriate method on one or more program-controlled master and/or slave devices, and a communications network, having master and slave devices, which is suitable for the execution of the method.

BACKGROUND INFORMATION

In data transmission between central control units, such as microcontrollers used as a master device and peripheral components, such as sensors used as slave devices, serial bus systems are frequently used. In motor vehicles, for instance, the SPI (serial peripheral interface) bus is often used. A serial clock signal is supplied by the microcontroller to the connected sensors, in this context. A data line is provided for the data transfer from the microcontroller to the sensors (MOSI=master out slave in), a data line for the data transfer from the sensors to the microcontroller (MISO=master in slave out) and a selection line for the selection of one or more connected sensors (CSB=chip select). Various data protocols are known for this bus system that is based on four lines.

It was provided, for instance, that additional selection lines or chip select lines be provided, corresponding to the number of peripheral devices, which requires a plurality of select ports on the respective microcontroller. This makes possible that, in a select cycle, which is defined by a specified level of the select signal, both the request data rates and the corresponding response data frames are able to be transmitted via the MOSI and MISO lines, if a request and a response to it take place within one select cycle. However, the first, that is, highest-order bits of the response are not able to be allocated specifically to the request, since the selected slave device or peripheral device first has to, at least partially, evaluate the request data frame. Consequently, not all bits of the data frames are used efficiently.

A similar problem arises if only a single selection line is provided, and the selection of the selected peripheral component by address bits in the request data frame, that is sent via the MOSI line, is specified. If both the request data frame and the corresponding response data frame are sent in the same selection cycle, the first bits of the respective response data frame cannot be allocated in a request-specific manner. It was provided in addition, that one should send the request data frames and the response data frames in different selection cycles. With that, an equalization in time takes place between a request by the microcontroller and the corresponding response by the selected slave device or peripheral device. It is true that the complete data frame can then be used for the transmission of request-specific bits, but a halving of the data throughput comes about if each sensor is connected to a chip-select line, as is the case, for example, in the so-called Autoliv protocol.

SUMMARY OF THE INVENTION

It is therefore an object of the exemplary embodiments and/or exemplary methods of the present invention to create an improved method for data transmission between master and slave devices.

A method for the transmission of data frames is provided, according to the present invention, between a master device and one or more slave devices via a bus system. The bus system has at least one request line for transmitting request data frames from the master device to the slave device, one response line for the transmission of response data frames by the slave devices to the master device and at least one selection line for activating the slave devices. The request data frames and the response data frames are transmitted, in this context, having at least one address bit for addressing one of the slave devices, having useful data bits and having at least one length indicator bit for indicating the data frame length.

By master device one may understand, for instance, a microcontroller or a central computer for evaluating sensor data. Peripheral devices, sensor devices or additional controllable devices come into consideration as slave devices. The request data frames and the response data frames may be transmitted synchronously with one another. It is conceivable, for instance, that in each case following a request data frame an appertaining response data frame is transmitted, two different selection cycles being affected. The respective transmission of a request data frame and a response data frame is started, for example, by changing the level of the selection signal on the selection line. The selection signal may be set to a specified logical level, in this context, for the duration of the transmission of the request data frame and/or the response data frame. Following a request data frame, a response data frame may be sent by the addressed slave device, having the same address bits.

The exemplary embodiments and/or exemplary methods of the present invention particularly makes it possible that, as a function of the useful data bits of a request data frame, a long, for instance, 32-bit response data frame is sent by the addressed slave device. This may be necessary, for example, if a microcontroller as master device queries particularly voluminous date from a sensor as slave device. It is then also possible that, as a function of the useful data bits of a request data frame, a subsequent request data frame is transmitted that is extended by additional bits. Commands, for example, are written in the useful data bits, which relate to the querying of sensor data. Since the master device expects an extended response data frame, in order not to interfere with the synchronicity of the data transfer, a following extended request data frame is also sent, which is transmitted in parallel to the extended response data frame, at the same time. An extended response data frame may also be required if a longer request data frame is sent at the same time, for instance, having a write command and data to be written.

The additional bits of an extended request frame may have check bits, particularly for a cyclical redundancy check, and the length indication bits indicate the length of the extended request frame. The cyclical redundancy check is a method for determining a check value for data to be transmitted, so that one may detect errors in the transmission of the data.

If an extended request data frame is sent, the length-indicating bits of a synchronously sent response data frame indicate the unchanged length of the response data frame. As long as the selection signal, controlled by the master device, responds to the affected slave device, it sends bits so that an extended response data frame is created.

In one variant of the method, a respective data frame has a parity bit or check bit for a cyclical redundancy check as a function of the length-indicating bit. Consequently, it is possible, for example, to switch over between various data frame lengths, for instance, from 16 to 32 bits, a cyclical redundancy check taking place as an additional security feature of the longer data frames.

The address bits may be transmitted as the highest-order bits of a respective data frame. This ensures that the address of the addressed slave is recognized as rapidly as possible. Furthermore, a read-write bit is advantageously transmitted to a predetermined bit position in the request data frame, and a status bit is transmitted at the same bit position in the response data frame. The decoding of the useful data, for instance, commands, is simplified thereby in the slave device. Moreover, the status bit may supply information on errors in the data transfer or in the slave devices. The bit positions of the address bits, of the useful data bits, of the length-indicating bits, of the read-write bits, of the status bits, of the parity bits and/or of the check bits may be established to be the same for all data frames.

The exemplary embodiments and/or exemplary methods of the present invention also supplies a communications network having at least one master device and a plurality of slave devices which are connected to a bus system, the master devices and the slave devices being designed in such a way that an appropriate method for the transmission of data frames is carried out. The bus system may be developed as an SPI bus, for example.

Additional advantageous embodiments of the present invention are the subject matter of the dependent claims and the exemplary embodiments described below.

In the following, the exemplary embodiments and/or exemplary methods of the present invention are explained in greater detail on the basis of exemplary embodiments with reference to the attached figures.

DETAILED DESCRIPTION

Unless specifically mentioned otherwise, identical or functionally equivalent elements have been provided with the same reference numerals in the figures.

Figure 1:
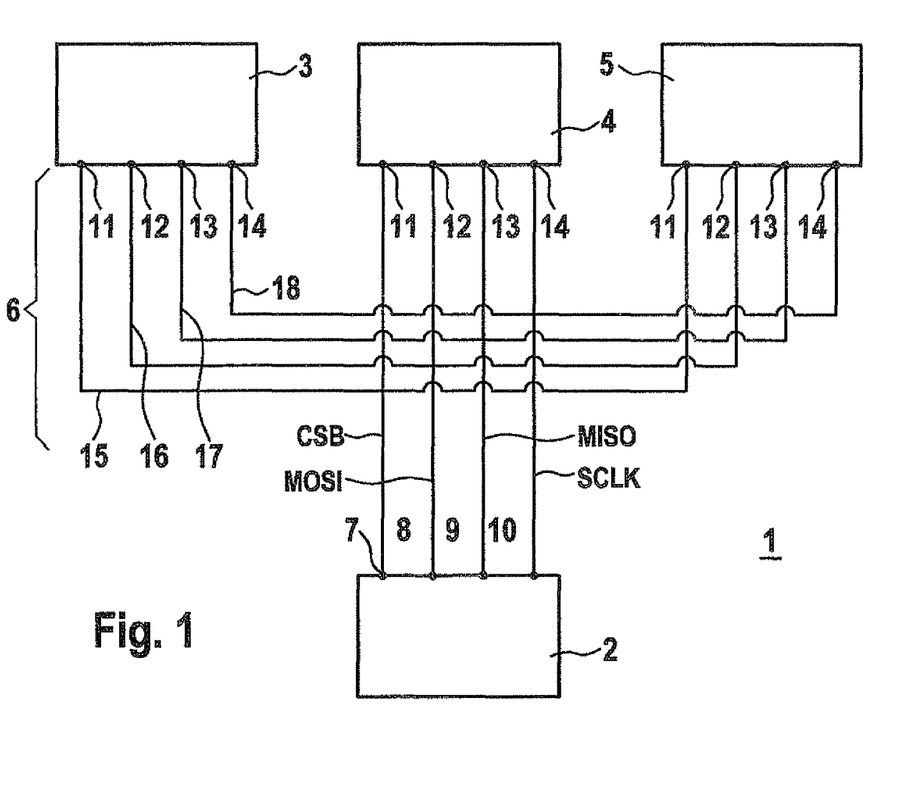
FIG. 1 shows a specific embodiment of a communications network for executing a data transmission method according to the present invention.

FIG. 1 shows a communications network 1 having a master device 2 and a plurality of slave devices 3, 4, 5. Master device 2 may be developed as a microcontroller, for example. Slave devices 3, 4, 5 may be developed, for example, as application-adapted circuits (ASIC's) (application specific integrated circuits) having sensor elements. It is possible, for example, to design slave devices 3, 4, 5 as sensors. Conceivable in a motor vehicle is, for example, the control of an electronic stabilization system (ESP) by a microcontroller 2, as a function of rate of rotation data with respect to various vehicle axes, acceleration data, rotational speed data and/or steering angle data, that are supplied by appropriate sensors 3, 4, 5. In the following, the terms "master device" and "microcontroller", as well as "slave device" and "sensor", "sensor device" and "peripheral device" are used synonymously.

Sensors 3, 4, 5 are connected to master device 2 via a bus system 6, which is developed as an SPI bus, for example. Bus system 6, in this context, has a selection line or chip-select line 15, a request line or MOSI line 16, a response line or MISO line 17 and a clockline 18 for a clock signal SCLK. Master device 2 generates clock signal SCLK at its output 10, which is conducted via clockline 18 to the corresponding input terminals 14 of slave devices 3, 4, 5. Master device 2 generates chip-select signal CSB at an output 7, which is conducted via selection line 15 to the corresponding inputs 11 of slave devices 3, 4, 5. As a rule, the chip-select signal is low-active, that is, slave devices 3, 4, 5 are activated in response to a logical L-level of the chip-select signal and await request data on request line 16, which is connected to corresponding terminals 12. A corresponding selected slave device 3, 4, 5 then supplies a response data frame to response line 17 via a corresponding output 13, which is conducted to a corresponding input 9 of the master device.

Figure 2:
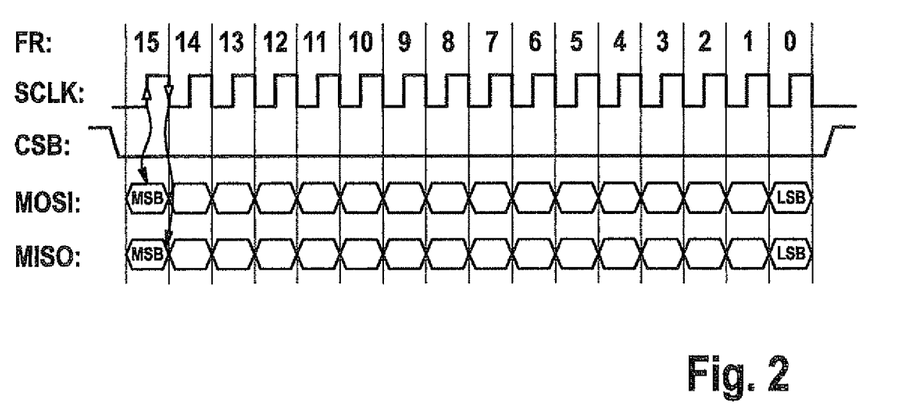
FIG. 2 shows an exemplary data frame structure.

FIG. 2 schematically shows a typical 16-bit data frame. In line FR, in this context, the numbering of bits of a request data frame MOST and of a response data frame MISO are shown, which are indicated in the two lower lines. The bits of the data frames are placed on the corresponding response data line or request data line using clock signal SCLK. The low-active chip-select signal is denoted as CSB. Because of the two separate request data lines and response data lines 16, 17 it is possible to transmit at the same time synchronously a 16-bit-including request data frame and a response data frame, for instance.

Figure 3:
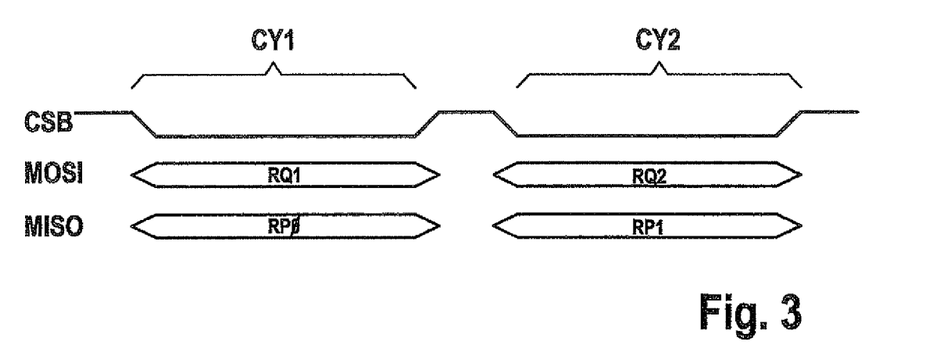
FIG. 3 shows a time sequence of request data frames and response data frames.

The selection signal or chip-select signal CSB, however, in an embodiment having only one selection line 15, activates all slave devices 3, 4, 5 connected to it at the same time. Therefore, according to the exemplary embodiments and/or exemplary methods of the present invention, an addressing, and with that, the selection of the respective queried slave device is undertaken by inserting address bits into the request data frames. The exemplary embodiments and/or exemplary methods of the present invention also provides, in this context, that in a selection cycle, which is defined by chip-select signal CSB lying on the L-level, request data frames for a selected slave device and their response data frames not be transmitted at the same time. Rather, it is provided, as shown in FIG. 3 in greater detail, to send appertaining response data frame RP1 to a request data frame RQ1 in the immediately following selection cycle. In a design layout as indicated in FIG. 1, a first request data frame RQ1 is sent to slave device 3, 4, 5 in a selection cycle CY1, for example, by master device 2 via the MOSI line. The request data frame includes address bits addressing one of the slave devices, in this instance.

In subsequent selection cycle CY2, the slave device designated by the address bits in the first request data frame RQ1 sends a corresponding response data frame RBI via the MISO line. This ensures that the complete data frame for useful data is ready, since the slave device, addressed in first request data frame RQ1, has enough time for decoding the corresponding request command in request data frame RQ1. Both request data frames RQ1, RQ2, which are sent via MOSI line 16, and response data frames RP0, RP1, which are sent via MISO line 17 by the slave devices have the same structure. However, the request data frames each have a read-write bit at a predefined bit position, while the response data frames have a status bit at this bit position. This is explained in greater detail in the following.

Figure 4:
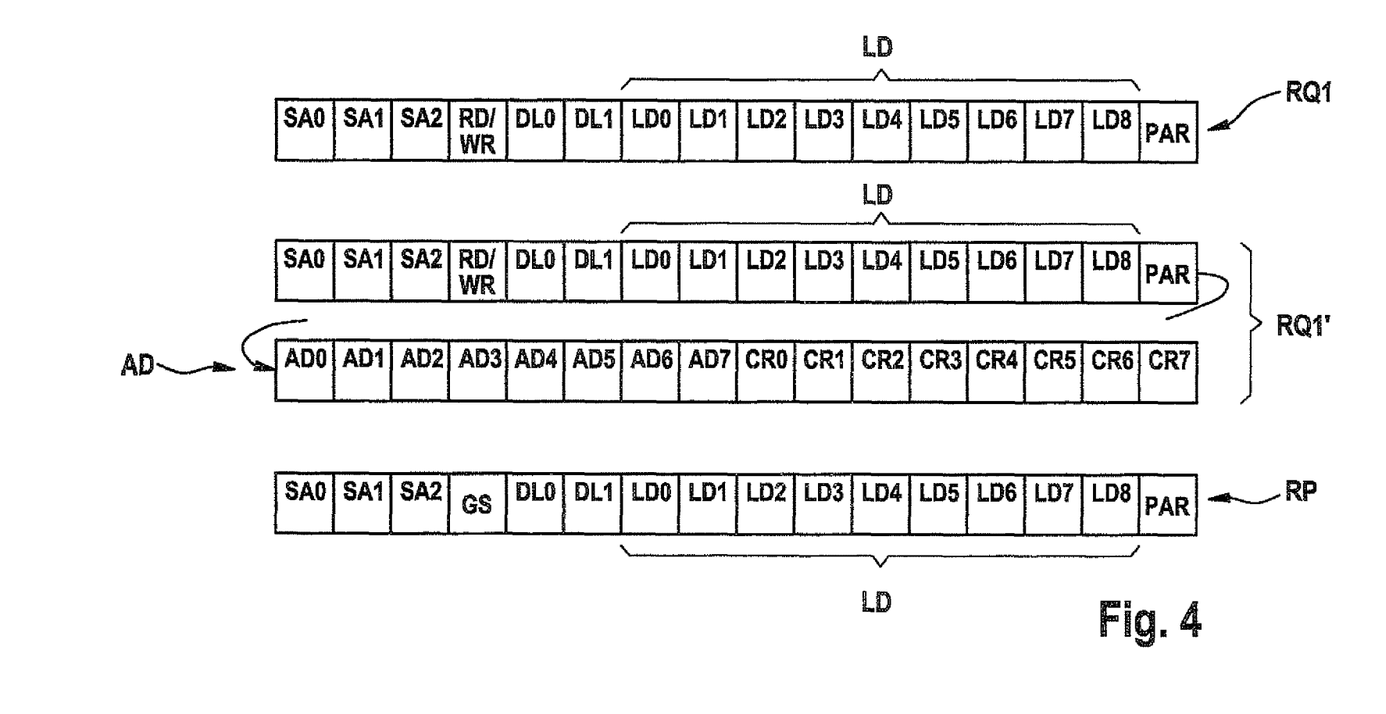
FIG. 4 shows an exemplary embodiment for 16-bit data frames and for data frames extended to 32 bits.

Exemplary 16-bit data frames are shown in FIG. 4. First a request data frame RQ1 having 16-bit length is shown, in this context. The highest-order bit is shown at the left and the lowest-order bit is shown at the right, in FIG. 4. The first three bits, that is, high-order bits of the request data frame are allocated to address bits SA0, SA1, SA2. These address bits establish which of slave devices 3, 4, 5 is requested by master device 2. At the fourth-highest place in request data frame RQ1, a read-write bit RD/WR is provided which signals to the addressed slave devices 3, 4, 5 whether a read or a write command is following. This simplifies the decoding of the respective transmitted command. At the fifth-highest and sixth-highest places, two length indication bits DL0, DL1 are provided which specify the length of request data frame RQ1.

In the case of two length-indicating bits, a coding is conceivable, for example, in which 00 stands for 16-bit request data frame, 01 stands for 32-bit frame lengths, 10 stands for 48 bits and 11 stands for 64-bit data frame. Other allocations are also possible, in this instance. Between the lowest-order bit, which is developed as parity bit PAR, nine bits of useful data LD0-LD8 are provided. Useful data LD0-LD8 in the request are, as a rule, commands to the slave device addressed by address bits SA0, SA1, SA2. Useful data LD0-LD8 in response RP are the sensor data which the sensor sends back to the microcontroller.

In FIG. 4, RP denotes a corresponding subsequent response data frame sent by the addressed slave device 3, 4, 5. It has the same structure as request data frame RQ1 sent in the preceding selection cycle. The first, or rather highest three bits are allocated to address bits SA0, SA1, SA2, which correspond to the address of the transmitting slave 3, 4, 5. Instead of a read-write bit, a status bit GS is provided at the fourth-highest bit position. If slave device 3, 4, 5 has detected an erroneous data transmission, for instance, of preceding request data frame RQ1, it is able to report this via a corresponding status bit GS. The lowest-order bit is again a parity bit PAR, useful data LD0-LD8, sensor data, for example, being provided between the bit positions of status bit GS and parity bit PAR.

In FIG. 4, in addition, an extended request data frame RQ1' is shown, which includes 32 bits. It is possible that a request of master device 2 to a slave device 3, 4, 5 means more useful data bits are desired. Master device 2 may, for example, prompt the addressed slave device 3, 4, 5, via an appropriate command in useful data LD of the request data frame, to send back a 32-bit data frame having eighteen or more useful data bits LD in one response data frame. In order to ensure the synchronicity of the data transmission via the corresponding SPI bus, during the longer response data frame, the simultaneously sent following request data frame RQ1' has to be extended.

Extended request data frame RQ1', in the first 16 bits, first of all has a usual data structure, then additional bits AD0-AD7, and eight check bits CR0-CR7 as check bits for a cyclical redundancy check. The extension by 16 bits is taken into account in length-indicating bits DL0, DL1 of extended request data frame RQ1'. An extension of data frames in 16-bit increments may be provided, for example. With that, in the case of two length-indicating bits, data frames come about having a length of 16, 32, 48 or 64 bits. The number of useful data bits LD in the respective data frame is able to be indicated by the length-indicating bits, or even the complete length of the data frame, inclusive of address bits SA0, SA1, SA2, status bits GS or read-write bits RD/WR, length-indicating bits DL0, DL1, check bits CR0-CR7 and useful data bits LD.

If a master device 2 sends an extended request data frame RQ1', it nevertheless receives in parallel a valid response data frame of a structure and length as designated in FIG. 4 by RP. Length indication bits DL0, DL1 still indicate 16-bit data frame lengths. Further additional bits for the duration of the transmission of request data frame RQ1', sent in parallel, are appended by the slave device as long as selection signal CSB activates the slave device. The present invention thereby makes possible a simple switchover among various data frame lengths which are conditioned, for instance, upon the type of useful data or the commands embedded therein for slave devices 3, 4, 5, or sensor data sent back to master device 2.

It can be established that, as of a data frame length of more than 16 bits, deviating from a simple parity check, check bits for an 8-bit cyclical redundancy check are inserted as lowest-order bits. In the case of a simple cyclical redundancy check CRC (cyclic redundancy check) the data to be transmitted are regarded as dyadic polynomial coefficients, and the corresponding polynomial is divided by a specified generator polynomial modulo. The resulting modulo remainder then yields the CRC check bits. In order to verify that the data transmitted, that is, the useful data, have no error, the useful data received are interpreted, with the added CRC check bits, as a binary sequence, and are again modulo-divided by the established CRC polynomial. If no modulo remainder is yielded, the useful data transmitted are regarded as error-free. Furthermore, more effortful cyclical redundancy checks are also conceivable.

Figure 5:
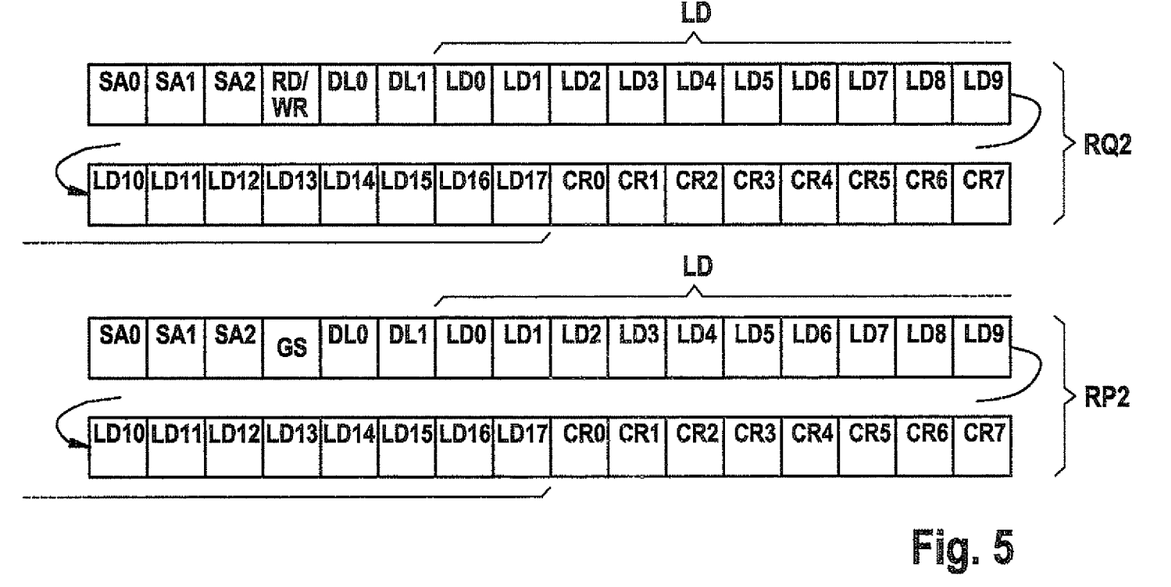
FIG. 5 shows an exemplary embodiment for 32-bit data frames.

FIG. 5 shows an example of a request data frame RQ2 and a corresponding response data frame RP2 having a 32-bit length. The respective highest-order bit positions are allocated to three address bits SA0, SA1, SA2. In the case of request data frame RQ2, the fourth-highest bit is a read-write bit RD/WR, and in the case of response data frame RP2 it is a status bit GS. This is followed by two length-indicating bits DL0, DL1 which, for instance, in a coding of 01 indicate the data frame length to be 32 bits. Eight lowest-order bit positions are provided, having CRC check bits for useful data bits LD0-LD17 that are situated between the length-indicating bits and the check bits. The transmission of a 32-bit data frame takes place in 32 clock cycles, which form a chip-select cycle. Response data frame RP2 is transmitted in the select cycle that directly follows the select cycle that was sent in request data frame RQ2.

Figure 6:
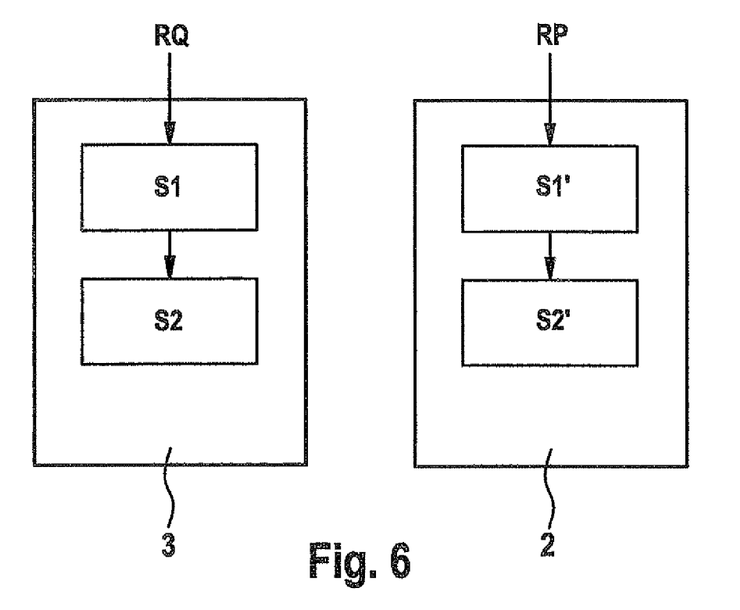
FIG. 6 shows a representation of method steps in a master device and a slave device.

FIG. 6 schematically shows which method steps are carried out by master and slave devices 2, 3. The respective devices are developed in such a way that they carry out the above-mentioned methods and appropriately generate the data frames. One corresponding slave device 3 receives a request data frame RQ, according to FIG. 4 or 5, for example. In a first step S1 it is determined, with the aid of the received length-indicating bits, whether a 16-bit data frame is involved or a longer one. All data frames which are longer than 16 bits are submitted to an 8-bit CRC. In case the length-indicating bits indicate a 16-bit request data frame, the latter is checked only using the transmitted parity bit PAR.

Subsequently, in step S2, a determination is made of the number of required clock pulses during the selection phase of the sensor or of slave device 3, as a function of length-indicating bits. With that, there takes place a security check as to whether all the data corresponding to the indicated length were received clocked by the length-indicating bits. Since the length-indicating bits code the number of bits of the data frame of the request, the number of the request cycles is thereby also determined. The useful data of the request are able to be extracted, since these instructions have a known length and it is known from the read-write bit whether a write command or a read command is involved. The useful data of the response are able to be extracted, since it is known from the length-indicating bits at which place the data frame ends, or where the useful data are present in the frame.

On the side of master device 2, first of all the valid data frame length of the response is determined with the aid of length-indicating bits DL, and either a parity check or a CRC check is carried out on the useful data. This takes place in a step S1'. It is known to the microcontroller or master device 2 what length response data frame RP has, since in the preceding selection cycle, a corresponding command was sent by master device 2 about the useful data. Consequently, in step S2', the useful data, such as sensor data, are extracted and evaluated.

The exemplary embodiments and/or exemplary methods of the present invention especially have the advantage that flexibly different data frame lengths are able to be processed and transmitted. Furthermore, the data frames are able to be used completely for data exchange. It is possible to use them completely because of the time-shifted request data frames and response data frames. Because of the insertion of a parity bit or a plurality of CRC check bits, the data transmission furthermore becomes particularly secure.

Although the exemplary embodiments and/or exemplary methods of the present invention was described above in terms of the exemplary embodiments, it is not limited to them, but rather is modifiable in numerous ways. Additional data frames are conceivable that deviate from the data frame lengths shown in FIGS. 4 and 5. The bit positions shown there for the address bits, the read-write bits, the length-indicating bits, the status bits and check bits may also be changed. Furthermore, it is conceivable to provide a plurality of chip-select lines in order to reduce, for example, the address space or the number of address bits required in the data frames. The data transmission method provided is not limited to an SPI bus, but may be used in many ways in synchronous serial bus systems.

What is claimed is:

1. A method for transmitting data frames between a master device and at least one slave device via a bus system, the method comprising:
   transmitting, using at least one request line of the bus system, request data frames from the master device to the at least one slave device;
   transmitting, using a response line of the bus system, response data frames from the at least one slave device to the master device, wherein the request data frames and the response data frames are transmitted synchronously with one another during selection cycles; and
   activating, using at least one selection line of the bus system, the at least one slave device;
   wherein the request data frames and the response data frames are transmitted together with at least one address bit for addressing the at least one slave device, useful data bits and at least one length-indicating bit for indicating the data frame length;
   wherein, for a selected request data frame transmitted in a given selection cycle, an appertaining response data frame is transmitted in a selection cycle directly following the selection cycle of the selected request data frame;
   wherein, depending on useful data bits of the selected request data frame, the appertaining response data frame is an extended response data frame; and
   wherein, depending on useful data bits of the selected request data frame, an extended request data frame extended by additional bits is transmitted during the selection cycle of the appertaining response data frame.

2. The method of claim 1, wherein the transmitting of a request data frame and a response data frame is started by changing a level of a selection signal on the selection line.

3. The method of claim 1, wherein the master device sets the selection signal for a duration of the transmission of at least one of the request data frames and the response data frames.

4. The method of claim 1, wherein following a request data frame, a response data frame having the same address bits is sent by an addressed slave device.

5. The method of claim 1, wherein the additional bits include check bits, for a cyclical redundancy check, and the length-indicating bits indicate a length of the extended request frame.

6. The method of claim 1, wherein the length-indicating bits of a response data frame, sent synchronously with an extended request data frame, indicate an unchanged length of the response data frame.

7. The method of claim 1, wherein as a function of the length-indicating bits, each data frame has a parity bit or check bits for a cyclical redundancy check.

8. The method of claim 1, wherein the address bits are transmitted as highest-order bits of a respective data frame.

9. The method of claim 1, wherein a parity bit is particularly transmitted as a lowest-order bit to at least one of the request data frame and the response data frame.

10. The method of claim 1, wherein the request data frames and the response data frames include 16 bits, 32 bits, 48 bits or 64 bits.

11. A method for transmitting data frames between a master device and at least one slave device via a bus system, the method comprising:
    transmitting, using at least one request line of the bus system, request data frames from the master device to the at least one slave device;
    transmitting, using a response line of the bus system, response data frames from the at least one slave device to the master device; and
    activating, using at least one selection line of the bus system, the at least one slave device;
    wherein the request data frames and the response data frames are transmitted together with at least one address bit for addressing one of the at least one slave device, useful data bits and at least one length-indicating bit for indicating the data frame length;
    wherein a read-write bit is transmitted at a predetermined bit position to the request data frame, and a status bit is transmitted to the response data frame at the same bit position.

12. A method for transmitting data frames between a master device and at least one slave device via a bus system, the method comprising:
    transmitting, using at least one request line of the bus system, request data frames from the master device to the at least one slave device;
    transmitting, using a response line of the bus system, response data frames from the at least one slave device to the master device; and
    activating, using at least one selection line of the bus system, the at least one slave device;
    wherein the request data frames and the response data frames are transmitted together with at least one address bit for addressing one of the at least one slave device, useful data bits and at least one length-indicating bit for indicating the data frame length;
    wherein bit positions of at least one of the address bits, the useful data bits, the length-indicating bits, read-write bits, status bits, parity bits, and check bits are determined in the same way for all data frames.

13. A non-transitory computer-readable data storage medium storing a computer program having program codes which, when executed on a computer, performs a method for transmitting data frames between a master device and at least one slave device via a bus system, the method comprising:

transmitting, using at least one request line of the bus system, request data frames from the master device to the at least one slave device;
transmitting, using a response line of the bus system, response data frames from the at least one slave device to the master device, wherein the request data frames and the response data frames are transmitted synchronously with one another during selection cycles; and
activating, using at least one selection line of the bus system, the at least one slave device;
wherein the request data frames and the response data frames are transmitted together with at least one address bit for addressing the at least one slave device, useful data bits and at least one length-indicating bit for indicating the data frame length;
wherein, for a selected request data frame transmitted in a given selection cycle, an appertaining response data frame is transmitted in a selection cycle directly following the selection cycle of the selected request data frame;
wherein, depending on useful data bits of the selected request data frame, the appertaining response data frame is an extended response data frame; and
wherein, depending on useful data bits of the selected request data frame, an extended request data frame extended by additional bits is transmitted during the selection cycle of the appertaining response data frame.

14. A communications network, comprising:
a bus system;
at least one master device; and
at least one slave device, the devices being connected to the bus system;
wherein the at least one master device and the at least one slave device are configured for transmitting data frames between a master device and at least one slave device via a bus system, by performing the following:

transmitting, using at least one request line of the bus system, request data frames from the master device to the at least one slave device;
transmitting, using a response line of the bus system, response data frames from the at least one slave device to the master device, wherein the request data frames and the response data frames are transmitted synchronously with one another during selection cycles; and
activating, using at least one selection line of the bus system, the at least one slave device;
wherein the request data frames and the response data frames are transmitted together with at least one address bit for addressing the at least one slave device, useful data bits and at least one length-indicating bit for indicating the data frame length;
wherein, for a selected request data frame transmitted in a given selection cycle, an appertaining response data frame is transmitted in a selection cycle directly following the selection cycle of the selected request data frame;
wherein, depending on useful data bits of the selected request data frame, the appertaining response data frame is an extended response data frame; and
wherein, depending on useful data bits of the selected request data frame, an extended request data frame extended by additional bits is transmitted during the selection cycle of the appertaining response data frame.

15. The communications network of claim 14, wherein the bus system is a clocked bus system, and wherein the master device supplies a clock signal to the at least one slave device via a clock line.

16. The communications network of claim 14, wherein the bus system is an SPI bus.

\* \* \* \* \*

UNITED STATES PATENT AND TRADEMARK OFFICE
CERTIFICATE OF CORRECTION

PATENT NO.       : 8,516,174 B2                                       Page 1 of 1
APPLICATION NO. : 12/598999
DATED            : August 20, 2013
INVENTOR(S)      : Goerlich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Fifteenth Day of September, 2015

Michelle K. Lee
*Director of the United States Patent and Trademark Office*